United States Patent
Larson et al.

(10) Patent No.: US 9,272,793 B2
(45) Date of Patent: Mar. 1, 2016

(54) MODULAR STANCHION SYSTEM

(71) Applicant: The Boeing Company, Chicago, IL (US)

(72) Inventors: Kim Marie Larson, Olalla, WA (US); Raymond Cho Eng, Seattle, WA (US); Clayton Lynn Munk, Maple Valley, WA (US); Dan Dresskell Day, Seattle, WA (US); Gordon Dale Davis, Marysville, WA (US)

(73) Assignee: The Boeing Company, Chicago, IL (US)

( * ) Notice: Subject to any disclaimer, the term of this patent is extended or adjusted under 35 U.S.C. 154(b) by 162 days.

(21) Appl. No.: 14/265,946

(22) Filed: Apr. 30, 2014

(65) Prior Publication Data
US 2015/0344154 A1    Dec. 3, 2015

Related U.S. Application Data

(63) Continuation-in-part of application No. 13/926,646, filed on Jun. 25, 2013.

(51) Int. Cl.
*B64F 5/00* (2006.01)

(52) U.S. Cl.
CPC ............. *B64F 5/0009* (2013.01); *B64F 5/0036* (2013.01); *Y10T 29/50* (2015.01)

(58) Field of Classification Search
CPC ..... B23P 21/00; B64F 5/0009; G05B 19/401; G05B 19/4083; G05B 19/44
See application file for complete search history.

(56) References Cited

U.S. PATENT DOCUMENTS

| | | | | |
|---|---|---|---|---|
| 2,378,043 A | | 6/1945 | Sorensen et al. | |
| 4,691,905 A | * | 9/1987 | Tamura | B23K 37/047 269/266 |
| 4,822,014 A | * | 4/1989 | Buchler | B23Q 1/621 269/309 |
| 4,995,146 A | * | 2/1991 | Woods | B25B 5/003 269/45 |
| 5,050,288 A | * | 9/1991 | Woods | B21J 15/10 29/407.1 |
| 6,029,352 A | * | 2/2000 | Nelson | B23P 19/04 29/429 |
| 6,170,157 B1 | * | 1/2001 | Munk | B23P 21/00 244/123.1 |

(Continued)

FOREIGN PATENT DOCUMENTS

EP    2 604 524 A2    6/2013

OTHER PUBLICATIONS

Extended European Search Report dated Aug. 28, 2015 for Application No. EP 15165868.9-1757.

*Primary Examiner* — Lee D Wilson
*Assistant Examiner* — Tyrone V Hall, Jr.
(74) *Attorney, Agent, or Firm* — Smith Moore Leatherwood LLP; Thomas W. Epting

(57) ABSTRACT

An apparatus for supporting a wing assembly at a wing assembly support height. Base sections are provided, each having a different predetermined height with respect to one another. A movable platform carries a plurality of base sections, and a plurality of wing assembly support sections rest on base sections and include wing assembly connectors, which are movable in a first plane and a second plane generally perpendicular relative to the first plane. A differential height is defined between the wing assembly support height and the combined heights of the platform and the height of wing assembly connector, relative to the bottom of the wing assembly support section. At least one of the base sections is of a predetermined height approximating the differential height and is carried on the platform. The wing assembly support section is carried on such base section.

21 Claims, 8 Drawing Sheets

(56) References Cited

U.S. PATENT DOCUMENTS

| | | |
|---|---|---|
| 6,314,630 B1 | 11/2001 | Munk et al. |
| 6,779,272 B2 | 8/2004 | Day et al. |
| 2002/0073535 A1* | 6/2002 | Radowick .............. B23Q 3/186 29/720 |
| 2004/0040154 A1 | 3/2004 | Day et al. |
| 2011/0054694 A1* | 3/2011 | Munk .................... B25B 11/02 700/275 |
| 2015/0314892 A1* | 11/2015 | DesJardien ........... B64F 5/0009 29/559 |

* cited by examiner

MODULAR STANCHION SYSTEM

CROSS-REFERENCE TO RELATED APPLICATION(S)

The present application is related to U.S. patent application Ser. No. 13/926,646, entitled Modular Stanchion System, filed Jun. 25, 2013, the content of which is incorporated herein by reference in its entirety.

FIELD

The present disclosure relates generally to configurations, systems, and methods for supporting relatively large, elongated structures. More specifically, certain aspects of the disclosure relate to configurations, systems, and methods for manufacturing, maintenance, inspection, testing, and evaluation of aircraft wing assembles, wherein stanchions of readily variable heights may be employed.

BACKGROUND

In the manufacture of elongated components, and in particular aircraft wings, support stands (also referred to as stanchions) of differing heights may be required. This may be the case with aircraft wings in particular, wherein the thickness of an aircraft wing may change considerably, moving from the root of the wing (where the wing attaches to an aircraft fuselage) to the tip of such wing. To adequately support the wing, multiple stanchions are typically used along the length of both sides of the wing. These stanchions may be required to each be of a custom height in order to support a particular location of a specific model of wing, depending on a number of factors, including, without limitation, the weight to be supported, the design tolerances, the type and amount of work and/or inspection to be done, etc. Further, support stands or stanchions may be required which, in addition to support, can provide proper alignment of an elongated component during assembly or transport. In some cases, it may be required that a support stand function as a jig in addition to support functions. Additionally, operability within a range of alignment configurations may be required. Given the variety of wing models which may require manufacture, maintenance, inspection, testing, evaluation, etc., the construction of stanchions that are custom-made for each of the various wing models and/or configurations can be expensive, labor intensive, and can adversely bear on productions schedules.

Further, transport of elongated components, such as aircraft wings, may require adjustment of the height of support stands in order to compensate for changing terrain conditions beneath the stanchions. For example, movement of an elongated component across a workshop or assembly operation floor can result in load shifting during movement across uneven or unleveled floor surfaces. Load shifting of this type may, in some cases, adversely affect structural integrity of elongated components. Distribution and/or re-distribution of changing loads along the elongated structure during transit may be required, in some cases involving measurement and height/load adjustment during transit. Moreover, in some cases, transport of elongated components may require positioning and/or repositioning of the support stands along one or more axes of rotation or along one or more planes in order to compensate for deviations from predetermined positions which are desired for certain assembly operations and which, in some cases, may not be associated with load shifting.

Further limitations and disadvantages of conventional and traditional approaches to the support of wings and other elongated structures may become apparent to one of skill in the art, through comparison of such systems with the teachings and examples set forth in the present disclosure.

SUMMARY

It would be desirable to provide systems, methods, and apparatuses that address the issues discussed above, as well as other potential issues, and also to provide a modular stanchion system which is readily reconfigurable for production systems of a variety of aircraft wing models. Moreover, it would be beneficial to provide configurations, systems, and methods for supporting aircraft wings and/or other elongated structures during manufacturing, maintenance, inspection, testing, and/or evaluation through use of stanchions of readily adaptable heights. Additionally, it would be beneficial to provide configurations, systems, and methods for providing proper alignment of an aircraft wing and/or other elongated structure during such operations through use of stanchions of readily adaptable heights.

Briefly, an example implementation of a modular stanchion system as disclosed herein may include a predetermined or preselected height upper section having an actuation system, controls and a movable slide table together with one or more lower base sections of preselected heights. This arrangement allows for quickly configurable and/or reconfigurable stanchions for a variety of aircraft wing models or other elongated structures, in that the overall stanchion height can be changed by replacing the lower base with another lower base of a different height. Wing attachments for connecting the stanchion system to the wing can be varied as necessary or desired by attaching an arm to the slide table on the upper section. A modular movable platform may be provided that is also of a predetermined size and/or height for use in connection with one or more other such modular movable platforms for supporting the stanchions. Further example implementations of a modular stanchion system as disclosed herein may comprise load cells connected thereto, with each load cell automatically determining the load placed on one arm. Multiple load cells can be placed in communication with a control system capable of coordinating the operation of load cells and to provide height adjustments to arms on the upper sections of the stanchions.

Accordingly, configurations, systems, and method are disclosed for facilitating such support of wings and/or other large elongated structures substantially as shown in and/or described in connection with at least one of the figures, and as set forth more completely in the claims.

Examples of the present disclosure are generally directed to a method and apparatus for supporting one or more wings or other elongated structures. In one example implementation, a system, or apparatus, is disclosed for supporting a wing assembly at a wing assembly support height relative to a support surface, the apparatus comprising at least one movable platform having a first height and a plurality of base sections, each having a different predetermined height with respect to one another. A plurality of wing assembly support sections are provided, and a wing assembly connector is connected to each of the plurality of wing assembly support sections. At least wing one assembly connector is configured to be movable in a first plane and a second plane generally perpendicular with respect to the first plane. Each wing assembly support section defines a bottom, and the wing assembly connector is at a second height from the bottom. The movable platform and at least one wing assembly connector are configured such that the aggregate of the first height and the second height is less than the wing assembly support height and such that the difference between the aggregate of the first height and the second height and the wing assembly support height defines a differential height. At least one of the base sections is of a predetermined height approximating the differential height and is carried on the movable platform. And, the wing assembly support section is carried on the at least one of the multiple base sections being of a predetermined height approximating the differential height. At least two of the wing assembly connectors each include an arm, and wherein the first plane is generally perpendicular to the support surface and the second plane is generally parallel to the support surface. At least two of the wing assembly connectors each have a load cell connected thereto, wherein each load cell automatically determines load placed on one arm. Such example implementation may include arms which are movable in a third plane that is generally parallel to the first plane and generally perpendicular to the second plane.

Another example implementation may include an elevator device connected to each of the at least two wing assembly connectors, the elevator devices being operable to automatically move the arms in the second plane. Such an example implementation may further comprise a control system in communication with at least two load cells and at least two metrology devices and coordinating the operation of the load cells and/or the metrology devices. Further, the control system may be operable to automatically operate the elevator devices to move the arms in one or more planes in a manner which serves to distribute or re-distribute load on the at least two arms and/or to establish or reestablish a jigged position.

A further example implementation may include multiple, or a plurality of, movable platforms including at least one clamp mechanism that selectively joins the plurality of movable platforms to one another. Each of the plurality of movable platforms may include a first side and a second side generally opposite the first side, and at least one first clamp mechanism may be provided on the first side of each of the plurality of movable platforms, and at least one second clamp mechanism may be provided on the second side of each of the plurality of movable platforms, wherein, the first clamping mechanism and the second clamping mechanism cooperate with one another to selectively join the plurality of movable platforms to one another. Additionally or alternately at least one male index mechanism may be provided on the front side of each of the plurality of movable platforms, and at least one female index mechanism may be provided on the rear side of each of the plurality of movable platforms, wherein, the first index mechanism and the second index mechanism cooperate with one another to selectively register the plurality of movable platforms to one another.

In another example implementation, the first side and the second side each platform may define an opening and a compartment may be provided extending between the first side and the second side and communicating with the opening in each of the first side and the second side. A door may be provided pivotally attached to the movable platform for selectively allowing access to the compartment.

An example implementation may comprise the movable platform including a plurality of wheels that permit the movable platform to move about the support surface.

Yet another example implementation may include at least one wing assembly support section defining a compartment and at least one access door that is in communication with the compartment.

Still another example implementation may include at least one wing assembly support section including a movable table interposed between the at least one wing assembly support section and at least one of the base sections and the movable table being configured to allow relative generally rectilinear movement between the assembly support section and the at least one base section.

Moreover, an example implementation may include at least one outrigger connected to the movable platform that stabilizes the platform.

In other exemplary aspects of the disclosure, configurations, systems, and methods for supporting aircraft wings and/or other elongated structures during manufacturing, maintenance, inspection, testing, and/or evaluation through use of a stanchion including an upper section of a generally predetermined, fixed height having an actuation system, controls, and a movable table in combination with a base section selected from a collection of base sections, each being of a different, predetermined height.

In another exemplary implementation of the disclosure, a method is provided for supporting a wing assembly at a wing assembly support height relative to a support surface, the method comprising the steps of: providing at least one wing assembly; providing at least one movable platform having a first height; providing multiple base sections, each having a different predetermined height with respect to one another; providing a plurality of assembly support sections, a number of which corresponds to a number of base sections, and a wing assembly connector movable in a first plane and a second plane generally perpendicular with respect to the first plane on each of the wing assembly support sections; the wing assembly support section defining a bottom, and the wing assembly connector being at a second height from the bottom; providing each of at least two of the wing assembly connectors with load cells connected thereto, wherein each load cell automatically determines load placed on one connector; providing each of at least two of the wing assembly connectors with metrology devices connected thereto, wherein each metrology device automatically determines positional data for one connector; providing a control system in communication with the load cells and the metrology devices; aggregating the first height of the movable platform and the second height of the wing assembly connector from the bottom of the wing assembly section; determining a differential height by comparing the totaled first height and second height to the wing assembly support height; selecting one of the multiple base sections of a predetermined height approximating the differential height and positioning the selected one of the multiple base sections upon the platform; positioning the wing assembly support section on top of the selected one of the multiple base sections; and connecting the wing assembly connector to the wing assembly for supporting the wing assembly.

In another example implementation, the method further comprises providing an elevator device connected to each of the at least two wing assembly connectors, the elevator devices being operable to automatically move the arms in the second plane. The method can further comprise adjusting the wing assembly connectors along one or more planes with the elevator devices in order to distribute or re-distribute load on the connectors as measured by the load cells when, for example, moving the wing assembly across a support surface. In some implementations, the method may further comprise providing metrology data to the control system and adjusting wing assembly connectors along one or more planes with the elevator devices in order to establish or reestablish a jigged position as measured by the metrology devices.

The number of stanchions could, in one example arrangement, be determined by the size of a wing, the weight of the wing, and the design tolerances. Because an example implementation stanchion system may be of modular design, an upper section could be designed to include an actuation system, controls, and/or a moving slide table to hold the wing in the correct orientation. The lower, base section may, accordingly, be varied in height in order to support the wing as the thickness of the wing varies from the wing's root to its tip. To facilitate positioning of the stanchions, modular rolling platforms may be provided which can be linked together, for example with a coupling arrangement, to allow each stanchion to move individually, or if desired, in a generally horizontal plane collectively along a floor or other support surface.

The features, functions and advantages discussed herein may be achieved independently in various examples or may be combined in yet other exemplary aspects of the disclosure, the further details of which may be seen with reference to the following description and drawings.

BRIEF DESCRIPTION OF THE DRAWINGS

Figure 1:
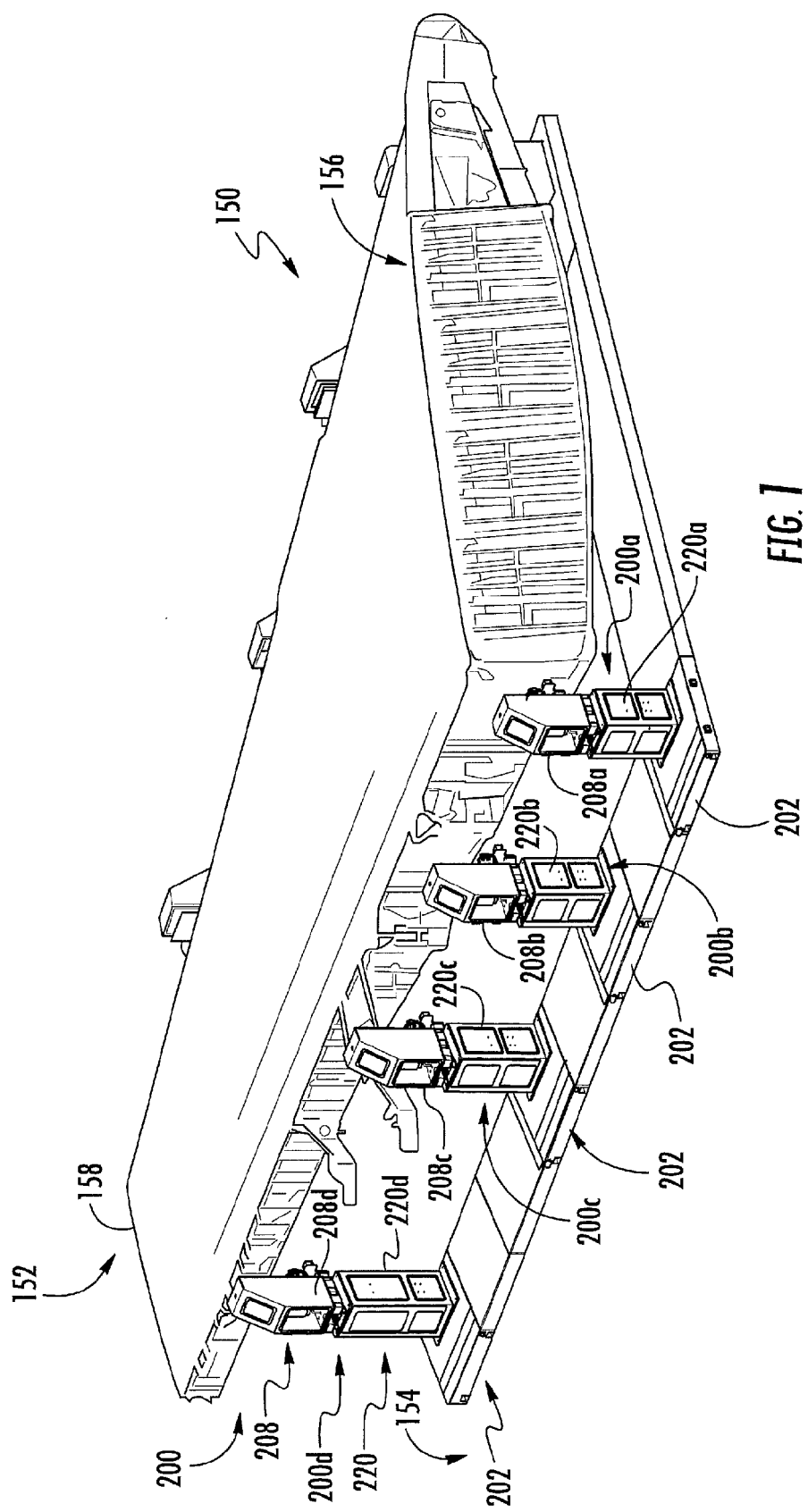
Figure 2:
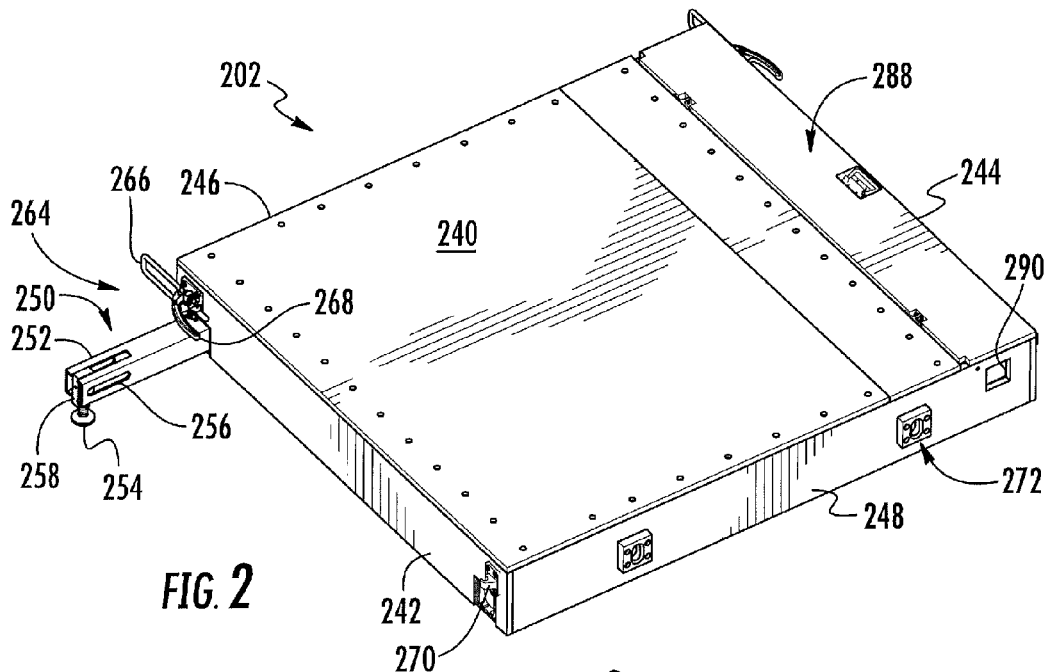
Figure 3:
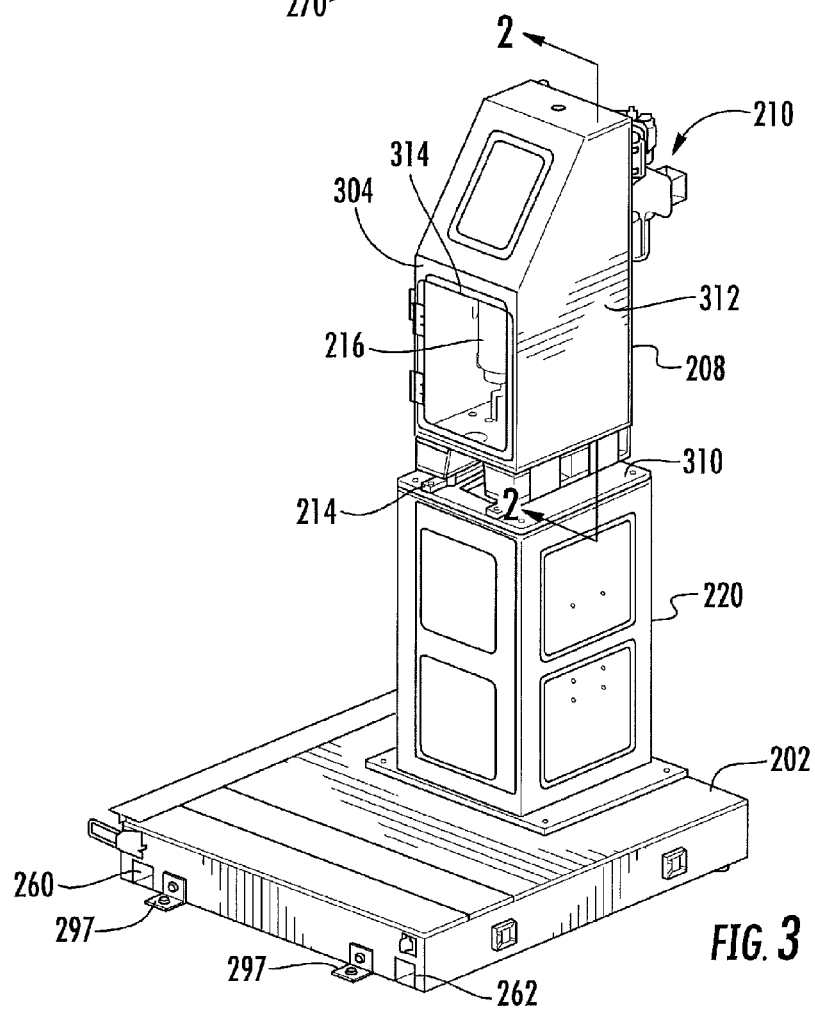
Figure 4A:
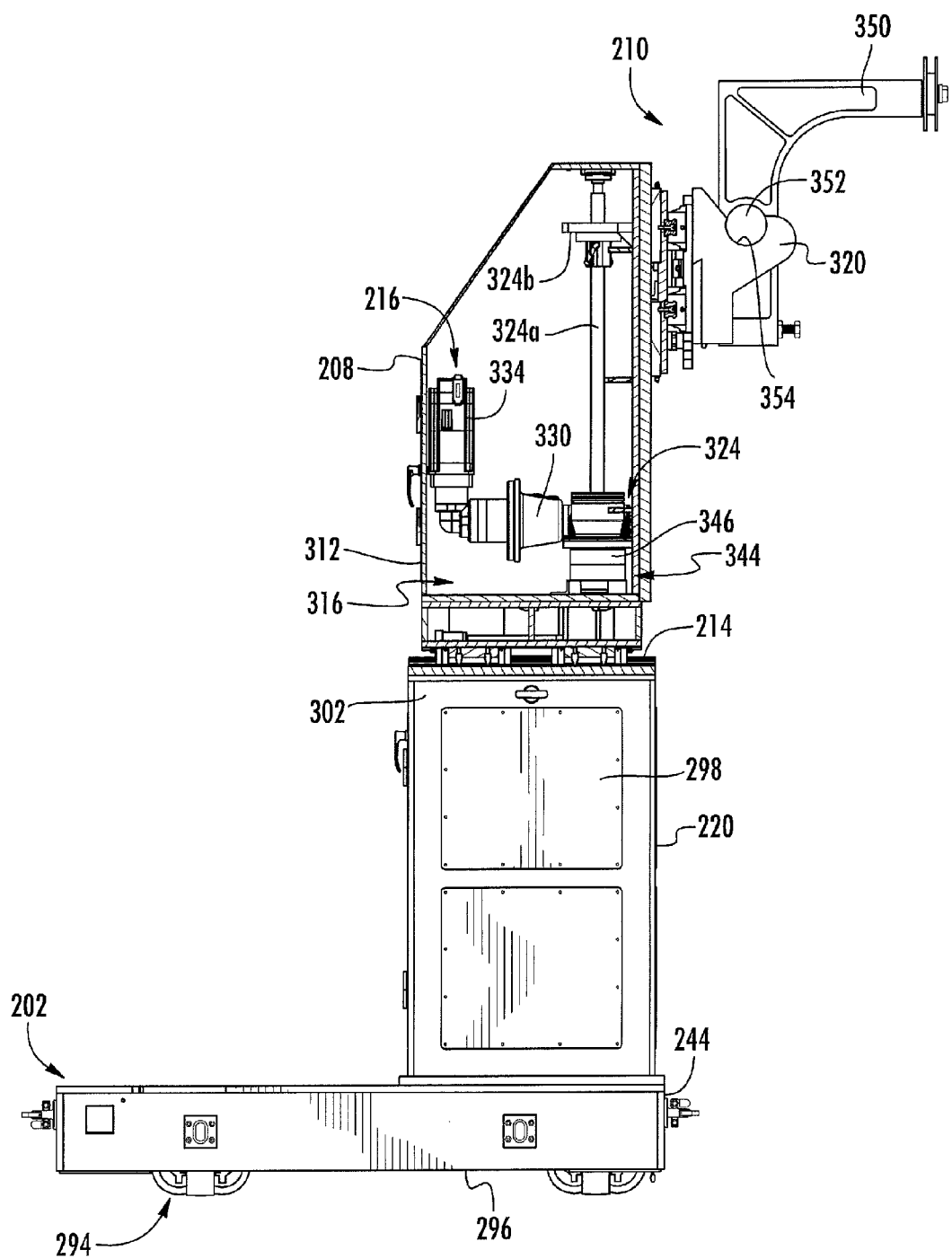
Figure 4B:
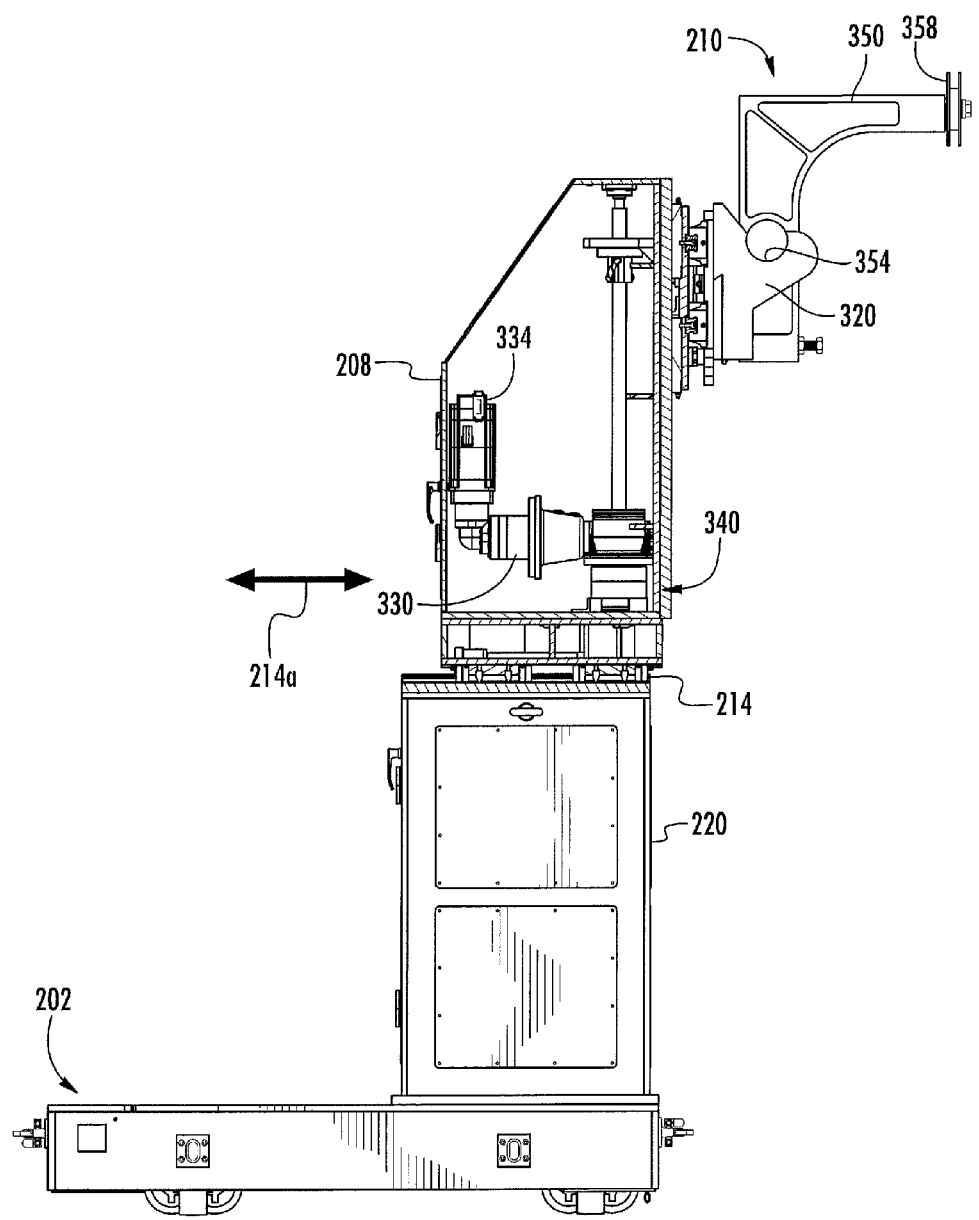
Figure 5:
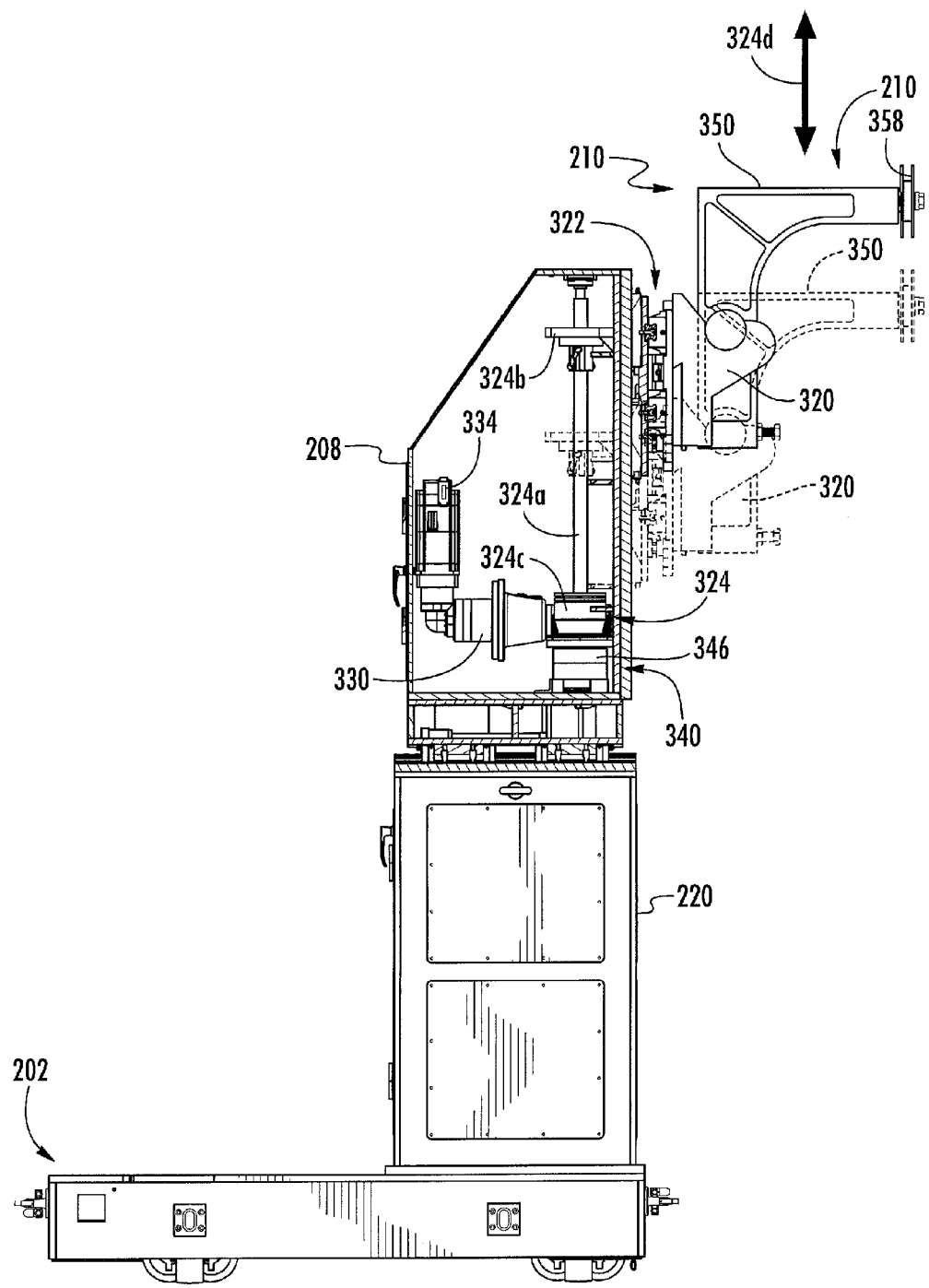
Figure 6:
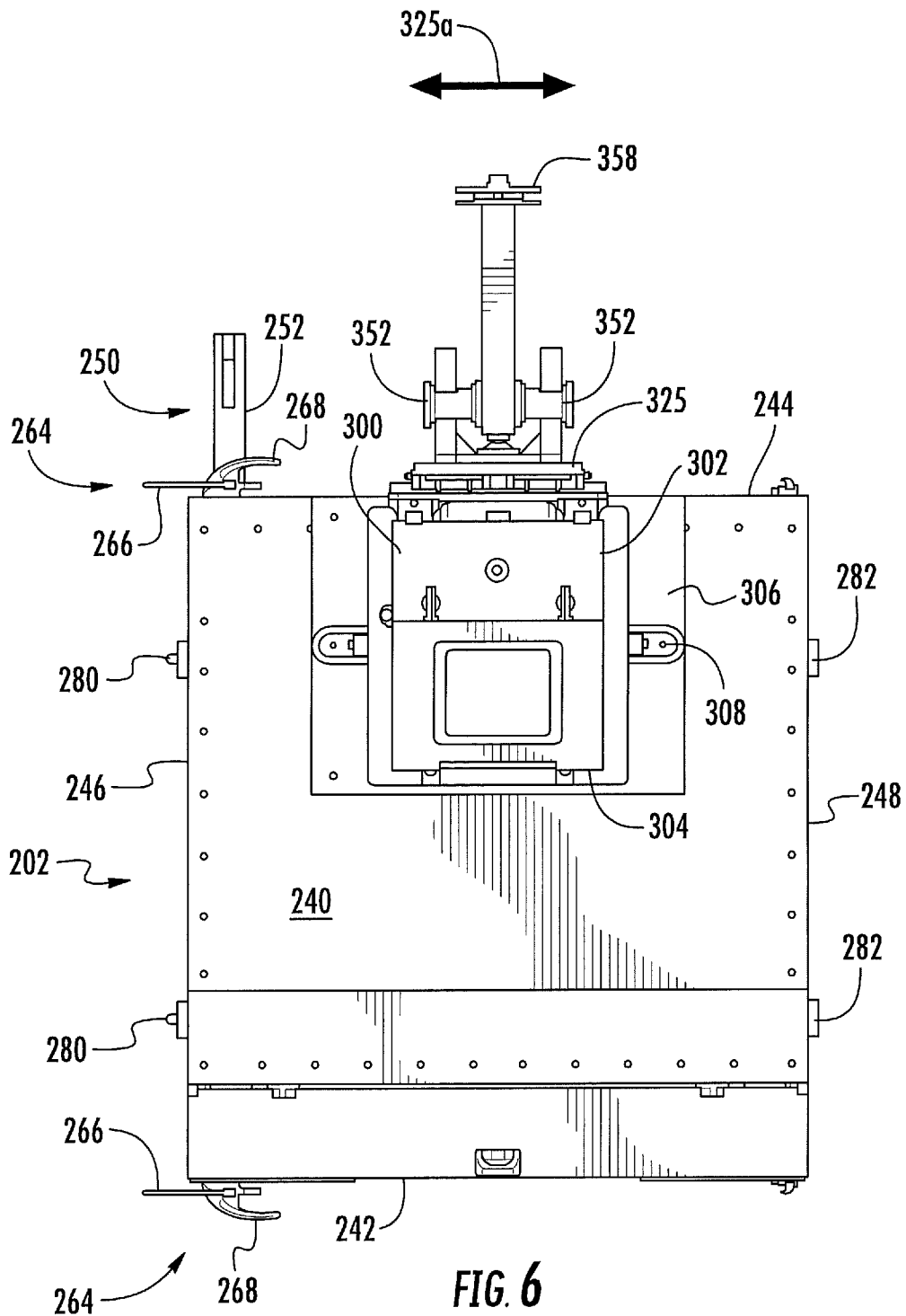
Figure 7:
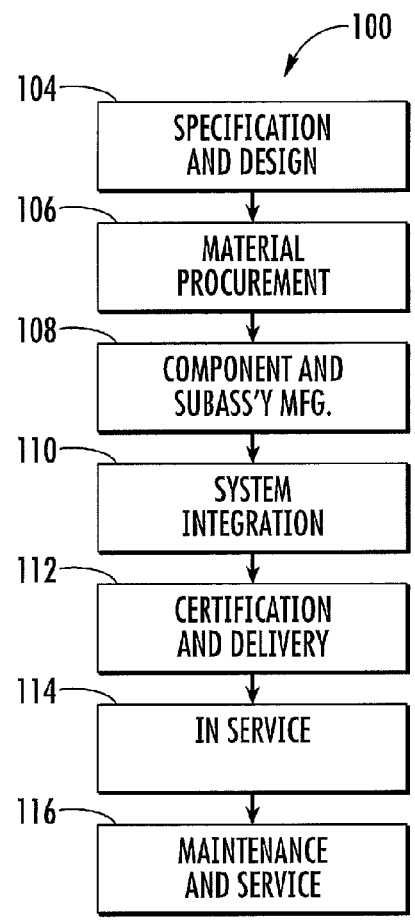

Having thus described exemplary aspects of the disclosure in general terms, reference will now be made to the accompanying drawings, which are not necessarily drawn to scale, and wherein:

FIG. 1 illustrates a side elevational view of an aircraft wing assembly supported by example implementations of a system of modular stanchions;

FIG. 2 is a perspective view of an example modular movable platform contemplated by the present disclosure;

FIG. 3 is a perspective view of an example stanchion and an example modular movable platform contemplated by the present disclosure;

FIGS. 4A and 4B are sectional views taken along lines 2-2 of FIG. 3 and an example upper stanchion moving horizontally between first and second positions with respect to a base section;

FIG. 5 is a sectional view similar to FIGS. 4A and 4B illustrating an example actuator system of an upper stanchion moving between first and second positions; and FIG. 6 is a plan view of an example stanchion and an example modular movable platform contemplated by the present disclosure;

FIG. 7 is a flow diagram of aircraft production and service methodology; and

Figure 8:
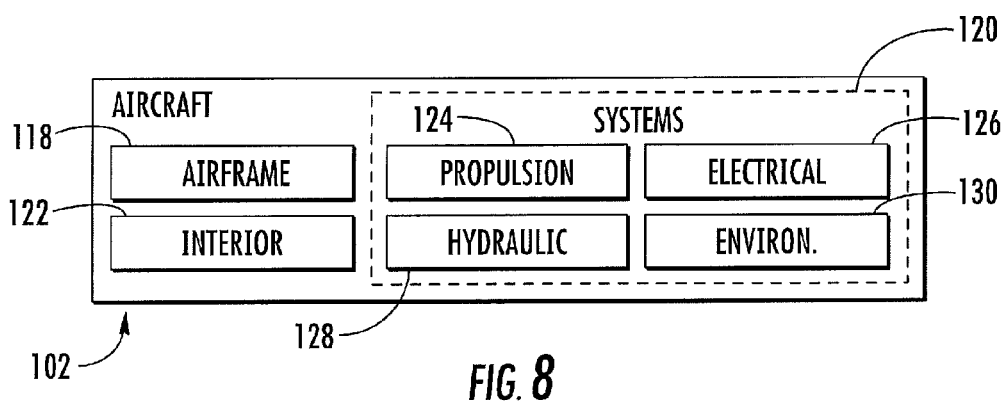

FIG. 8 is a block diagram of an aircraft.

Figure 9:
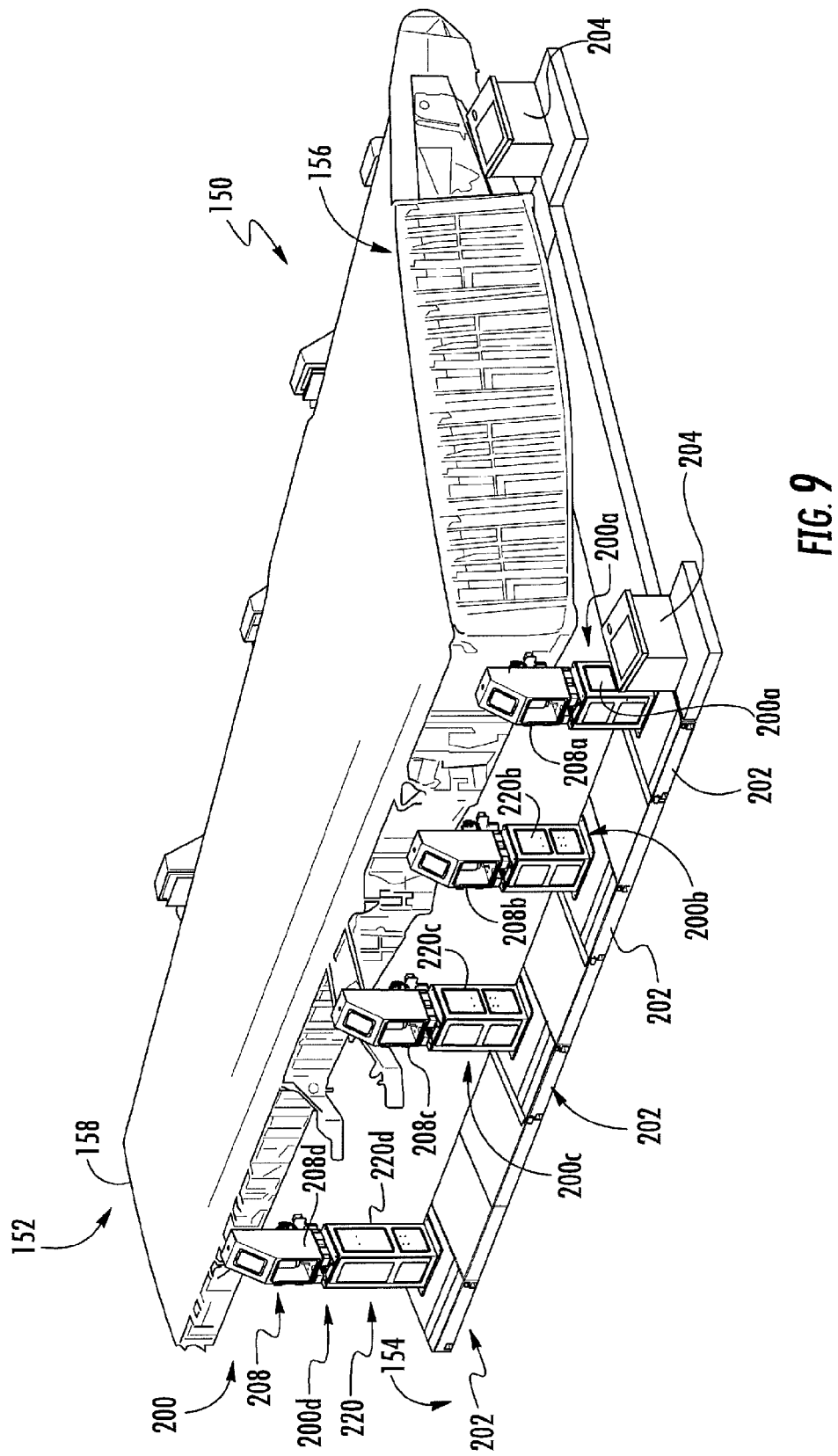

FIG. 9 illustrates a side elevational view of an aircraft wing assembly supported by an example apparatus for supporting a wing assembly.

DETAILED DESCRIPTION

Examples of the present disclosure will now be described more fully hereinafter with reference to the accompanying drawings, in which some, but not all examples of the disclosure are shown. Indeed, various exemplary aspects of the disclosure may be embodied in many different forms and should not be construed as limited to the examples set forth herein. Rather, these examples are provided so that this disclosure will be thorough and complete and will fully convey the scope of the disclosure to those skilled in the art. Like reference numerals refer to like elements throughout.

As used herein, "and/or" means any one or more of the items in the list joined by "and/or." As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. Further, as used herein, the term "exemplary" means serving as a non-limiting example, instance, or illustration.

Moreover, as used herein, the term, for example, or "e.g.," introduces a list of one or more non-limiting examples, instances, or illustrations.

Generally, in one example implementation of the present disclosure, a system is provided for supporting a wing assembly at a wing assembly support height relative to a support surface shown in FIG. 1, the subject matter described herein relates generally to a horizontal build line, generally 150, for a relatively large, elongated structure, such as an aircraft wing assembly, or simply, "wing," generally 152. Modular tooling stands, or stanchions, generally 200, can be mounted to a support surface, such as the floor, generally 154, or to modular rolling platforms, generally 202, which facilitate support wing assembly 152, such as in an assembly line and/or for maintenance, inspection, testing, and evaluation purposes. Platform 202 is of a predetermined height, which could be approximately 12 inches or any other suitable height. Stanchions 200 may allow a manufacturer to relatively quickly configure and/or reconfigure production system of various aircraft model wing sizes and configurations and/or other elongated structures.

As shown in FIGS. 1, 3, 4A, 4B, and 5, each stanchion 200 may include a wing assembly support section, such as a generally predetermined-height adjustable upper section, generally 208, which may contain components and systems, such as an arm configuration, generally 210, a movable slide table 214, and an actuation system, generally 216. A lower, base section, generally 220, is of a predetermined height and may be of construction of similar width and depth dimensions as compare to other lower sections shown herein as exemplary implementations, and also, could be one of a number of such base sections of varying heights, each being readily interchangeable with one another and fully compatible with an upper section 208 and a modular rolling platform, generally 202. This arrangement allows for the same overall stanchion design to be used in the assembly of wings with varying size/height requirements. Modular rolling platforms 202 are of a predetermined size and configuration, thereby allowing for generally interchangeable use with respect to a base section 220 and in stanchions 200, generally.

FIG. 1 illustrates, in particular, four stanchions (200a, 200b, 200c, 200d) each being carried on a platform 202. Each stanchion 200 includes a base section 220a, 220b, 220c, and 220d, respectively, and an upper section 208a, 208b, 208c, and 208d, respectively. Stanchion 200a is positioned near the root, generally 156, of wing 152 which is the thickest portion of wing 152. Stanchions 200b, 200c and 200d are spaced progressively further outwardly with respect to wing 152 and serve to support wing 152 as wing 152 is maintained, inspected, tested, evaluated, etc. Stanchion 200d is positioned furthermost outwardly with respect to root 156 of wing 152, and because the distance from floor 154 to a support portion of wing 152 increases as one moves from root 156 to tip 158 of wing 152, for support purposes, stanchion 200d is of a greater height from floor 154 than is stanchion 200a. However, each of stanchions 200a and 200d include a generally interchangeable upper section, 208a and 208d, respectively, with each of upper sections 200a, 200d being of substantially the same height as one another. Each of stanchions 200a and 200d are also mounted on a modular rolling platforms, 202a, 202d, respectively, and each of modular rolling platforms 202 also being interchangeable with one another, i.e., of substantially the same height and configuration as compared to one another.

Accordingly, in order to provide the additional elevation, or height, required by stanchion 200d, as compared to stanchion 200a, base section 220d of stanchion 200d is of greater height than base section 220a of stanchion 200a.

Turning to FIG. 2, modular rolling platform 202 is shown in more detail. Platform 202 includes a top surface 240 on which a base section 220 rests and is carried, such as shown in FIG. 3. Platform 202 includes a front wall 242, a rear wall 244 (FIG. 4A), a left side wall 246 (FIG. 6), and a right side wall 248. Extending from front wall 242 and/or rear wall 244 is an outrigger assembly, generally 250, that stabilizes platform 202 and which includes an arm 252 having a foot 254 configured to contact floor 154 is slidably carried for substantially rectilinear movement in slots 256 in which an upper portion 258 of foot member 242 may slide to and fro. Foot 254, in one example implementation, is threadingly connected to upper block member 258 to allow the foot to be moved upwardly and downwardly with respect to arm 252 and to ultimately, via arm 252, allow for platform 202 to be leveled, and/or generally fixed against movement with respect to floor 154. Although only one outrigger assembly 250 is shown, it is to be understood that such outrigger assemblies could be provided in one or both channels 260, 262 (FIG. 3) on front wall 242 of platform 202 and/or in rear wall 244.

FIG. 6 illustrates an example implementation for an outrigger assembly 250 is provided on rear wall 244. Front wall 242 of platform 202 also includes a clamp mechanism, generally 264, which includes a handle 268 and a loop, or clasp, 266 which is engagable with a hook member 270 on an adjacent front wall 242 of an adjacent platform 202, upon platforms 202 being placed in an adjacent relationship with respect to one another, such as is shown in FIG. 1. Referring to FIG. 2, handle 268 may be pivoted or otherwise actuated to cause loop 266 to engage and snugly clamp and/or lock loop 266 into hook member 270, similar to a buckle arrangement and/or a toggle-like manner. Similarly, rear wall 244 of platform 202 may include a loop and handle 266, 268 combination and hook member 270 (FIG. 6) for attaching to adjacent rear walls 244 of adjacent platforms 202, as shown in FIG. 1. Upon platforms 202 being placed adjacent one another, one or more loops 266 may engage one or more hook members 270, respectively, and the respective handles 268 may be actuated to cause loops 266 to snugly lock into respective hook members and thereby secure adjacent platforms together.

Platforms 202 may also include on sides 246 and 248 additional connectors 272 of selectively securing adjacent platforms 202 to one another. For example, side wall 246 of a platform 202 may include one or more male index mechanisms, connectors 280 (FIG. 6) which engage with female connectors, or index mechanisms, 282, that selectively register with one another to further secure adjacent platforms against relative movement with respect to one another, particularly against relative lateral movement with respect to one another (i.e., relative to the longitudinal dimension of wing 152).

As shown in FIG. 2, platforms 202 may further include a wire tray, generally 288, extending the length of platform 202 adjacent wall 244. Wire tray 288 is configured to carry wiring, cabling, hosing, etc. (not shown) between adjacent platforms 202, and such wiring may pass through openings 290, which may be in communication with both wire tray 288 and sides 246 and 248 (opening 290 is shown only in side 248 in the drawings). The wiring, cabling, hosing, etc. carried in wiring tray 288 may supply power, controls, pressurized air and/or hydraulic hosing, etc. to base sections 220 and/or upper sections 208 and may provide power and/or control instructions to base sections 220 and/or upper sections 208 for operations of arm configuration 210, movable slide table 214, and/or actuation system 216.

As shown in FIGS. 4A, 4B, and 5, the bottom portion of platform 202 may include castors, or wheels, generally 294, proximate the corners of the bottom portion. Wheels 294 may be selectively actuatable between a locked configuration to generally prevent platform from moving and an unlocked position for allowing platform 202 to move generally freely about the floor. Wheels 294 could also be configured to move between a retracted position above the lowermost edges 296 of the platform, such that the platform rests on the floor supported by lowermost edges 296 (to generally prevent platform from moving) and an extended, wherein wheels 294 extend below lowermost edges 296 and allow the platform to move generally freely about the floor. Brackets 297 (FIG. 3) may also be used to attach the platform to floor 154, if desired.

FIGS. 3, 4A, 4B, and 5 illustrate base section 220, which, as noted above, can be configured to be of different heights. Each base section 220 is configured to interchangeably attach to a platform 202, and, if desired, to receive wiring, cabling, hosing, etc. from wire tray 288 or otherwise. Base sections 220 are, in an example implementation, generally box-shaped, but it is to be understood that base sections 220 could be of other shapes and constructions, including, but not limited to, open frame construction, cylindrical construction (none shown), if desired. Base sections 220 may include one or more access panels and/or doors, generally, 298, on sides 300, 302 (FIG. 6), and/or on the front 304 or back thereof. One or more flanges 306 may be provided at the bottom of a base section 220 and may include holes through which fasteners 308 such as screws, bolts, quick-release fasteners (none shown) may pass to attach base section 220 to a platform 202. The upper surface 310 (FIG. 3) of base section 220 is configured to receive movable sliding table 214, which allows upper section 208 to selectively move generally rectilinearly with respect to base 220 and towards and away from wing 152. Movement of upper section 208 on the sliding table can be done manually and/or through a motorized and/or pressurized fluid configuration (not shown).

As shown in FIG. 4A, upper section 208 includes a cabinet 312 of a generally box-like configuration. Cabinet 312 includes an access door 314 (FIG. 3) which opens to a compartment 316 within cabinet 312. Inside compartment 316 is actuation system 216 which actuates arm mechanism 210, which is carried in a yoke 320. Yoke 320 is mounted on a bearing plate mechanism, generally 322, which is carried for generally rectilinear vertical movement upwardly and downwardly, such as shown in FIG. 5. An elevator device, such as a ball screw mechanism, generally 324, may be used to provided yoke 320 with such vertical movement, although it is to be understood that other mechanisms (such as pneumatic and/or hydraulic cylinders, cable mechanisms, etc.) (none shown) could also be used to cause such vertical movement, if desired. Ball screw mechanism 324 rotates a threaded shaft 324a on which a threaded support block configuration 324b is captured and restrained from rotation with respect to shaft 324a and instead moves generally rectilinearly up and down along shaft 324a, as shown by arrow 324d in FIG. 5. Support block 324b is connected to a bracket 325 (FIG. 6), and yoke 320 is carried on bracket 325 for side to side, or lateral, movement, as shown by arrow 325a in FIG. 6. Because support block 324b is connected to bracket 325, and yoke 320 is connected to bracket 325, yoke 320 moves vertically correspondingly with support block 324b and bracket 325.

As shown in FIG. 4A, in one example implementation, controls in upper section 208 may include one or more ball screw mechanisms 324 is connected to a right angle drive gear reducer 330, which is driven by a motor 334. Ball screw actuator 324c is powered by gear reducer 330 to rotate threaded shaft 324a of ball screw mechanism 324. Motor 334 is shown as being vertically disposed in FIG. 5, although it could be horizontally disposed or disposed at some other angle, if desired. Motor 334 may be powered via wiring, cabling, etc. carried in one or more platforms 202.

Controls included in upper section 208 may comprise one or more load cell arrangements, generally, 340 may be provided in compartment 316 that automatically determines a load placed on arm arrangement 210 and may include a load cell 344 and a pull plate 346 adjacent to load cell 344. Load cell arrangement 340 may be powered using wiring, cabling, etc. carried in one or more platforms 202.

Yoke 320 carries arm arrangement 210, which may include a generally L-shaped atm member 350 having ears 352 carried in receivers 354 in yoke 320. Arm member 350 may include a wing assembly connector, or, attachment portion 358 (FIG. 4B) configured for coupling with a corresponding and/or mating coupling (not shown) provided on wing 152. The coupling of attachment portion 358 with wing 152 (or other elongated structure) allows a portion of the weight and/or downward force of wing 152 to be borne by arm member 350, which in turn transmits the force through ball screw mechanism 324. The adjustability of upper section 308 towards and away from wing 152, via sliding table 214 (in the direction of arrow 214a is FIG. 4B) and the horizontal adjustability (via yoke 320 on bracket 325) and the vertical adjustability (via yoke 320 carried on support block 324b) of arm member 350 allows for a variety of degrees of freedom by which arm member 350 can be attached to wing 152, such as at spars (not shown) or other portions of wing 152.

Some implementations of apparatus and/or methods for supporting a wing assembly comprise at least two metrology devices. Metrology devices can provide positional information related to one or more arms 350 of the apparatus or system. In some implementations, metrology devices are attached to one or more arms. Any metrology device not inconsistent with the objectives of the present disclosure can be used. For example, metrology devices can comprise, consist, or consist essentially of one or more sensors operable to measure one or more of tilt motion, axial motion, radial motion, and face motion. In such configurations, metrology devices can measure and relay data corresponding to necessary positional changes of arms 350 to correct for deviations in arm 350 position from predetermined tolerances or values associated with a jigged position. Jigged positions comprise predetermined parameters, tolerances and values associated with particular assembly tasks to be carried out on an elongated component, such as a wing 152. Such deviations may occur, for example, during or after transport of an elongated component such as a wing 152. Necessary or desired positional changes of the arms 350 may be along one or more planes.

In certain example implementations, a control system, generally 204, may be placed in communication with at least two load cells 340 and/or at least two metrology devices (not shown) in an apparatus or system for supporting a wing assembly. The control system 204 can, in some cases, coordinate operation of and relay information provided by the load cells 340. Control systems 204 of this type can be configured to automatically operate elevator devices, such as a ball screw device 324, based on input from the load cells 340. Such operability can provide systems or apparatus comprising such control systems 204 with the ability to distribute or re-distribute load on the arms 350 of the apparatus or system.

The control systems 204 can provide the ability for an apparatus or system for supporting a wing assembly with a mechanism for preventing imbalance of loads during transit or transport of elongated structures, such as a wing 152 when, for example, moving the wing assembly across a support surface. In some cases, the control system 204 can coordinate operation of and relay information provided by the metrology devices (not shown). Control systems 204 of this type can be configured to automatically operate elevator devices, such as a ball screw device 324, based on input from the metrology devices (not shown). Such operability can provide systems or apparatus comprising such control systems 204 with the ability to establish or reestablish a jigged position of the apparatus or system. The control systems 204 can provide the ability for an apparatus or system for supporting a wing assembly with a mechanism for preventing or correcting deviation from a jigged position during or after transit or transport of elongated structures, such as a wing 152 when, for example, moving the wing assembly across a support surface.

Control systems 204 for communication with at least two load cells 340 and/or at least two metrology devices (not shown) can have any configuration not inconsistent with the objectives of the present disclosure. For example, control systems 204 can comprise wired or wireless communication devices whereby load cells and/or metrology devices can relay data signals to the control systems. The control systems 204 may then parse and relay the data in various manners. In some cases, the control system can provide information to a user or operator who may then manually or automatically adjust the height of the arms in order to distribute or re-distribute load balance and/or to establish or reestablish a jigged position. Alternatively, the control system 204 can parse load cell 340 data or metrology data automatically and can distribute or re-distribute load and/or establish or reestablish a jigged position balance without further input from a user or operator by adjusting the elevator devices, such as a ball screw device 324, in along one or more planes. Adjustment of the elevator devices can occur incrementally, as over predetermined time intervals. In one non-limiting example, a control system 204 described herein can parse or display input in intervals of about 10 seconds. Further, such implementations can perform adjustments to distribute or re-distribute load or to establish or reestablish a jigged position in 10 second intervals. Alternatively, adjustment of the elevator devices can occur in real time as load balance and/or wing position shifts. For the purposes of the present disclosure, "real time" indicates that adjustment responses initiating distribution or re-distribution of loads or establishment or reestablishment of a jigged position occur on the order of less than about 1 second after detection of loads and/or positions outside of predetermined parameters for load balance and/or wing or arm position.

The control system 204 may be implemented or realized with a general purpose processor, a content addressable memory, a digital signal processor (DSP), an application specific integrated circuit (ASIC), a field programmable gate array (FPGA), any suitable programmable logic device, discrete gate or transistor logic, discrete hardware components or any combination thereof, designed to perform the functions described herein. In this manner, a control system may comprise, consist, or consist essentially of a microprocessor, a controller, a microcontroller, a state machine or the like. A processor may also be implemented as a combination of computing devices, e.g., a combination of a digital signal processor and a microprocessor, a plurality of microprocessors, one or more microprocessors in conjunction with a digital signal processor core or any other such configuration.

In practice, the processor module may include processing logic configured to carry out the functions, techniques, and processing tasks associated with the operation of the control system 204.

In other exemplary aspects of the disclosure, configurations, systems, and methods for supporting aircraft wings and/or other elongated structures during manufacturing, maintenance, inspection, testing, and/or evaluation through use of a stanchion including an upper section of a generally predetermined or preselected and/or fixed height having an actuation system, controls, and a movable table in combination with a base section selected from a collection of base sections, each being of a different, predetermined height.

Examples of the present disclosure may be described in the context of an aircraft manufacturing and service method, generally depicted as 100, shown schematically in FIG. 7, and an aircraft, generally depicted as 102, shown schematically in FIG. 8, with the functions of service method 100 and construction of aircraft 102 being depicted as blocks and/or modules in such figures. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include, without limitation, any number of aircraft manufacturers and major-system subcontractors; a third party may include without limitation any number of venders, subcontractors, and suppliers; and an operator may be an airline, leasing company, military entity, service organization, and so on.

As shown in FIG. 8, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to the production process stage 108 may be fabricated or manufactured in a manner similar to components or subassemblies produced while the aircraft 102 is in service. Also, one or more apparatus examples, method examples, or a combination thereof may be utilized during the production stages 108 and 110, for example, by substantially expediting assembly of or reducing the cost of an aircraft 102. Similarly, one or more of apparatus examples, method examples, or a combination thereof may be utilized while the aircraft 102 is in service, for example and without limitation, for maintenance and service 116.

The present disclosure is applicable in the context of manufacturing an air craft 102 and service method 100, and/or in other manufacturing sectors, such as the automotive sector, space sector, heavy industry sector, surface and submarine vessel maritime sector, etc.

Exemplary implementations of configurations, systems, and methods for supporting elongated structures, such as aircraft wings, during manufacturing, maintenance, inspection, testing, and/or evaluation are described above in detail. The systems and methods are not limited to the specific implementations described herein, but rather, components of systems and/or steps of the method may be utilized independently and separately from other components and/or steps described herein. The disclosed dimensional ranges include all sub ranges there between. Further, tools and components described herein may be fabricated from any material that enables such tool or component to function as described herein. Each tool or component and each method step may also be used in combination with other components and/or method steps. Although specific features of various implementations may be shown in some drawings and not in others, this is for convenience only. Any feature of a drawing may be referenced and/or claimed in combination with any feature of any other drawing.

Many modifications and other exemplary aspects of the disclosure set forth herein will come to mind to one skilled in the art to which this disclosure pertains, having the benefit of the teachings presented in the foregoing descriptions and the associated drawings. Therefore, it is to be understood that the disclosure is not to be limited to the specific examples disclosed and that modifications and other exemplary aspects of the disclosure are intended to be included within the scope of the appended claims. Moreover, although the foregoing descriptions and the associated drawings illustrate examples in the context of certain example combinations of elements and/or functions, it should be appreciated that different combinations of elements and/or functions may be provided by alternative examples without departing from the scope of the appended claims. For instance, different combinations of elements and/or functions than those explicitly described above are also contemplated as may be set forth in the appended claims. Although specific terms are employed herein, they are used in a generic and descriptive sense only and not for purposes of limitation.

What is claimed is:

1. An apparatus for supporting a wing assembly at a wing assembly support height relative to a support surface, the apparatus comprising:
   at least one movable platform having a first height;
   a plurality of base sections, each having a different predetermined height with respect to one another;
   a plurality of wing assembly support sections, wherein each wing assembly support section corresponds to a respective one of base sections;
   a wing assembly connector connected to each of the plurality of wing assembly support sections;
   at least one wing assembly connector being configured to be movable in a first plane and a second plane generally perpendicular with respect to the first plane;
   each of the wing assembly support sections defining a bottom and the wing assembly connector being at a second height from the bottom;
   at least one movable platform and at least one wing assembly connector being configured such that the aggregate of the first height and the second height is less than a height of at least one of the wing assembly supports and such that the difference between the aggregate of the first height and the second height and the wing assembly support height defines a differential height;
   at least one of the multiple base sections being of a predetermined height approximating the differential height;

the at least one of the base sections being of a predetermined height approximating the differential height being carried on the movable platform;

at least one of the wing assembly support sections carried on at least one of the multiple base sections being of a predetermined height approximating the differential height;

at least two of the wing assembly connectors each including an arm, and wherein the first plane is generally perpendicular to the support surface and the second plane is generally parallel to the support surface;

at least two of the wing assembly connectors each having a respective load cell connected thereto, each load cell being configured to automatically determine the load placed on one arm;

at least two of the wing assembly connectors each having a respective metrology device connected thereto, each metrology device being configured to automatically determine positional data for one connector; and a control system in communication with each load cell and each metrology device.

2. The apparatus of claim 1, wherein the arms are each movable in a third plane that is generally parallel to the first plane and generally perpendicular to the second plane.

3. The apparatus of claim 1, further comprising:
an elevator device connected to each of the at least two wing assembly connectors, the elevator devices being in communication with the control system, and the control system being operable to direct the elevator devices to automatically move the arms in the second plane.

4. The apparatus of claim 1, wherein the control system is operable to automatically operate the elevator devices to move the arms in the second plane in a manner which serves to distribute or re-distribute load on the at least two arms.

5. The apparatus of claim 3, further comprising:
the at least one movable platform including a plurality of movable platforms; and
and each of the plurality of movable platforms including at least one clamp mechanism that selectively joins the plurality of movable platforms to one another.

6. The apparatus of claim 1, further comprising:
the at least one movable platform including a plurality of movable platforms, each of the plurality of movable platforms including a first side and a second side generally opposite the first side;
at least one first clamp mechanism on the first side of each of the plurality of movable platforms;
at least one second clamp mechanism on the second side of each of the plurality of movable platforms; and
wherein, the first clamping mechanism and the second clamping mechanism cooperate with one another to selectively join the plurality of movable platforms to one another.

7. The apparatus of claim 1, further comprising:
the at least one movable platform including a plurality of movable platforms;
and each of the plurality of movable platforms including a front side and a rear side generally opposite the front side;
at least one male index mechanism on the front side of each of the plurality of movable platforms;
at least one female index mechanism on the rear side of each of the plurality of movable platforms; and
wherein, the male index mechanism and the female index mechanism cooperate with one another to selectively register the plurality of movable platforms to one another.

8. The apparatus of claim 1, further comprising:
the at least one movable platform defining a first side and a second side generally opposite the first side;
the first side and the second side each defining an opening;
a compartment extending between the first side and the second side and communicating with the opening in each of the first side and the second side; and
a door pivotally attached to the movable platform for selectively allowing access to the compartment.

9. The apparatus of claim 1, further comprising:
the at least one movable platform including a plurality of wheels that permit the movable platform to move about the support surface.

10. The apparatus of claim 1, further comprising:
at least one wing assembly support section defining a compartment; and
at least one access door that is in communication with the compartment.

11. The apparatus of claim 1, further comprising:
at least one wing assembly support section including a movable table interposed between the at least one wing assembly support section and at least one of the base sections being of a predetermined height approximating the differential height; and
the movable table being configured to allow relative generally rectilinear movement between the at least one wing assembly support section and the at least one base section being of a predetermined height approximating the differential height.

12. The apparatus of claim 1, further comprising:
a movable bracket connected to the wing assembly connector that allows the arm to move in the third plane.

13. The apparatus of claim 1, further comprising:
the wing assembly connector including an arm, and wherein the first plane is generally perpendicular to the support surface and the second plane is generally parallel to the support surface;
an elevator device connected to wing assembly connector that automatically moves the arm in the second plane; and
a motor connected to the elevator device that powers the elevator device.

14. The apparatus of claim 1, further comprising:
at least one outrigger connected to the at least one movable platform that stabilizes the at least one movable platform.

15. The apparatus of claim 1, further comprising:
the at least one movable platform including a plurality of movable platforms;
and each of the plurality of movable platforms including at least one clamp mechanism that selectively joins the plurality of movable platforms to one another; and
the at least one movable platform including a plurality of wheels that permit the movable platform to move about the support surface.

16. The apparatus of claim 1, further comprising:
at least one wing assembly support section including a movable table interposed between the at least one wing assembly support section and the at least one of the multiple base sections being of a predetermined height approximating the differential height;
the movable table being configured to allow relative generally rectilinear movement between the at least one wing assembly support section and the at least one of the multiple base sections being of a predetermined height approximating the differential height;

the wing assembly connector including an arm, and wherein the first plane is generally perpendicular to the support surface and the second plane is generally parallel to the support surface; and an elevator device that automatically moves the arm in the second plane.

17. A method for supporting a wing assembly at a wing assembly support height relative, to a support surface, the method comprising the steps of:

providing at least one wing assembly;

providing at least one movable platform having a first height;

providing a plurality of base sections, each having a different predetermined height with respect to one another;

providing a plurality of wing assembly support sections wherein each wing assembly support sections corresponds to a respective one of the base sections, and a wing assembly connector movable in a first plane and a second plane generally perpendicular with respect to the first plane on each of the wing assembly support sections; the wing assembly support section defining a bottom and the wing assembly connector being at a second height from the bottom;

providing each of at least two of the wing assembly connectors with load cells connected thereto, wherein each load cell automatically determines load placed on one connector;

providing each of at least two of the wing assembly connectors with metrology devices connected thereto, wherein each metrology device automatically determines positional data for one connector;

providing a control system in communication with the load cells and the metrology devices;

aggregating the first height of the movable platform and the second height of the wing assembly connector from the bottom of the wing assembly section;

determining a differential height by comparing the aggregated first height and second height to the wing assembly support height;

selecting one of the multiple base sections of a predetermined height approximating the differential height and positioning the selected one of the multiple base sections upon the platform;

positioning the wing assembly support section on top of the selected one of the multiple base sections; and connecting the wing assembly connector to the wing assembly for supporting the wing assembly.

18. The method of claim 17, further comprising:

providing an elevator device connected to each of the at least two wing assembly connectors, the elevator devices being operable to automatically move the arms in the second plane one or more planes.

19. The method of claim 18, further comprising:

moving the wing assembly across the support surface.

20. The method of claim 19, further comprising:

adjusting the wing assembly connectors along the second plane with the elevator devices in order to distribute or re-distribute load on the connectors as measured by the load cells.

21. The method of claim 19, further comprising:

adjusting wing assembly connectors along one or more planes with the elevator devices in order to establish or reestablish a jigged position as measured by the metrology devices.

* * * * *